E. F. GRUNEWALD.
MIRROR ADJUSTER.
APPLICATION FILED AUG. 1, 1921.
1,407,149.　　　　　　　　　　Patented Feb. 21, 1922.
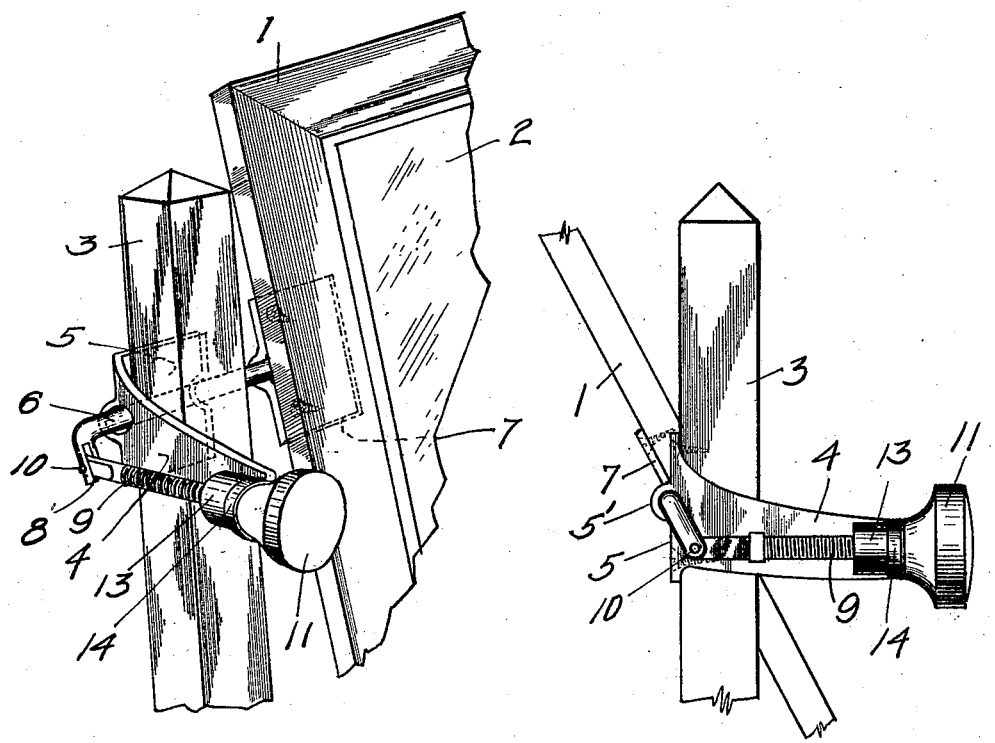
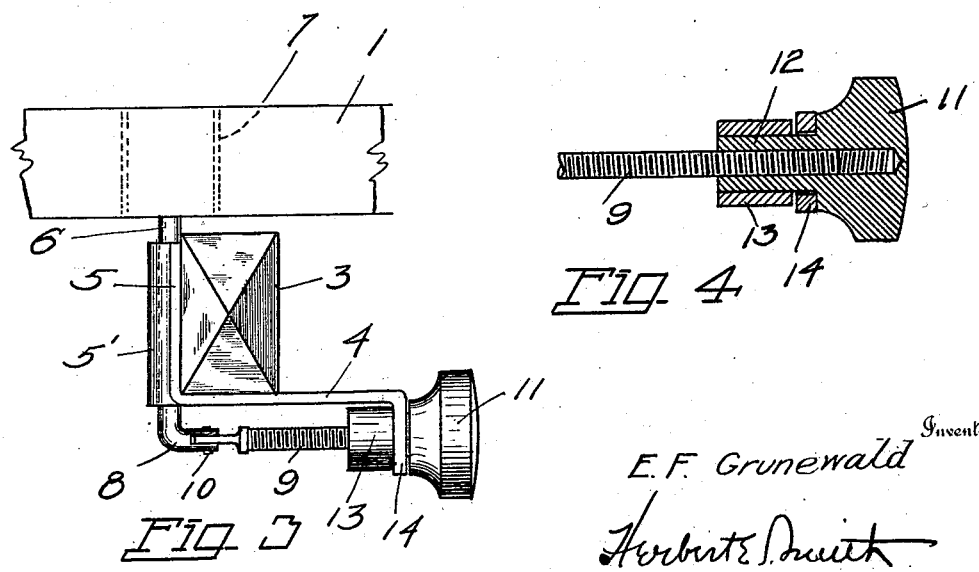
E. F. Grunewald, Inventor
Attorney

UNITED STATES PATENT OFFICE.

EDWARD F. GRUNEWALD, OF KAMIAH, IDAHO.

MIRROR ADJUSTER.

1,407,149.   Specification of Letters Patent.   Patented Feb. 21, 1922.

Application filed August 1, 1921. Serial No. 488,823.

*To all whom it may concern:*

Be it known that I, EDWARD F. GRUNEWALD, a citizen of the United States, residing at Kamiah, in Lewis County, and State of Idaho, have invented certain new and useful Improvements in Mirror Adjusters, of which the following is a specification.

The present invention relates to improvements in mirror adjusters for use in connection with bureaus, dressing tables, and other furniture where such devices are utilized, and is designed to provide a comparatively inexpensive device of this character which is simple in construction and operation, is readily applicable for use to the mirror and its support, and by means of which the mirror may with facility be tilted and adjusted to accommodate the user.

With these objects in view the invention consists in certain novel combinations and arrangements of parts involving a combined supporting and adjusting device, one of which is utilized at each side of the mirror, as will be hereinafter more fully described and claimed.

In the accompanying drawings I have illustrated one complete example of the physical embodiment of my invention in which one of a pair of supports is shown as the adjuster, and in which the parts are combined and arranged according to the best mode I have thus far devised for the practical application of the principles of my invention.

Figure 1 is a perspective view at one corner of a mirror illustrating the utilization of my invention.

Figure 2 is a side elevation of the device of Figure 1.

Figure 3 is a top plan view of the device.

Figure 4 is a sectional view illustrating the construction and operation of the non-traveling, adjusting nut.

In the preferred form of the invention as shown in the drawings I have illustrated a portion of a mirror frame 1 and indicated the glass at 2, and the numeral 3 designates a post or upright on a dressing table, bureau, or other piece of furniture with which the mirror may be used. It will of course be understood that a second, complementary supporting device is used for the mirror in order that the latter may be tilted or adjusted, and the device of my invention is designed to tilt or adjust the mirror, and retain the mirror in adjusted position.

In carrying out the invention I employ a bracket arm 4 which may be stamped or pressed from sheet metal, and fashion the same with an attaching plate 5 formed at right angles to the arm and this attaching plate is secured, as by screws to the rear face of the post 3 as shown.

Within the attaching plate which is formed as a bearing, is journaled a rock shaft or stud 6, extending horizontally to the rear of the mirror frame, and at one end this arm has a rigid plate 7 that is rigidly attached, as by screws to the rear face of the mirror frame. In this manner the mirror is supported to turn or be swiveled in the rock shaft bearing 5' of the angle plate 5, and at the opposite side of the mirror an axially alined support is also used.

The shaft 6 is formed of a metal bar or rod, and at its free end, beyond the bearing 5' is fashioned with a bent crank arm 8 at approximately right angles to the shaft, and this crank is connected to a screw bar 9 by a loose joint or pivot 10. The screw bar is disposed in approximately horizontal position and extends toward the front of the mirror where it is provided with a non-traveling, interiorly threaded nut 11 which is formed as a socket for the accommodation of the screw bar, and is used as a handle or knob for adjusting the mirror.

In Figure 4 it will be evident that the non-traveling nut is provided with a rounded or cylindrical sleeve portion 12, and on the sleeve a collar 13 is secured leaving an open annular space between the collar and knob portion 11 for the reception of the perforated ear 14 of the bracket arm 4. The ear 14 is projected laterally at right angles from the arm 4, and the sleeve 12 of the knob or nut is passed therethrough before the collar 13 is affixed on the sleeve, and the annular space between the shoulder 11ª of the knob and the collar provide means whereby the knob may be turned in the perforated ear.

Thus by turning the non-traveling nut to the right the screw bar is pulled to the right in the figures of drawing, and consequently the crank arm 8 is pulled also to the right, thus swinging or rocking the shaft 6 in its journal 5' and the rocking movement of the shaft causes the top of the mirror frame to tilt to the rear, bringing the lower portion of the mirror toward the front. A reverse movement of the knob will result in projecting the screw bar therefrom and swinging the top of the mirror toward the front and the bottom portion of the mirror toward the rear. This positive action of the non-traveling nut adjusts the mirror directly and with facility, and when once adjusted the mirror is held in rigid adjusted position by the connected parts. By utilizing the bifurcated or forked end 8' of the crank arm no lost motion is permitted and the flattened end 9' of the screw bar insures a close non-rattling joint between the screw bar and rock shaft and in this manner a compact arrangement of parts is secured.

As thus constructed the device is composed of a practical minimum of parts, thus reducing the cost of material and simplifying the construction and operation to a considerable degree, and the device provides an unobtrusive attachment which becomes a real ornamental feature of the piece of furniture to which it is attached.

Having thus fully described my invention, what I claim as new and desire to secure by Letters Patent is—

1. The combination with a mirror frame and post, of a bracket on the post, a rock shaft fixed to the frame and journaled in said bracket, a crank arm on the shaft, an angularly disposed screw bar pivoted to said crank arm, and a non-traveling nut supported in said bracket, and threaded over said screw bar.

2. The combination with a mirror frame and post, of a bracket on the post, a rock shaft fixed to the frame and journaled in said bracket, a crank arm on the shaft, an angularly disposed screw bar pivoted to said crank arm, an off-set perforated ear on said bracket and a non-traveling nut having a sleeve rotatable in said ear, and said nut threaded on the screw bar.

3. The combination with a mirror frame and post, of a bracket on the post, a rock shaft fixed to the frame and journaled in said bracket, a bifurcated crank arm on said shaft, a screw bar having a flattened end pivoted in said arm, an offset perforated ear on the bracket, a non-traveling nut on the screw bar having a sleeve rotatable in said ear, and a retaining collar on said sleeve.

In testimony whereof I affix my signature.

EDWARD F. GRUNEWALD.